United States Patent [19]

Philipp et al.

[11] 4,218,280

[45] Aug. 19, 1980

[54] METHOD OF CROSS-LINKING POLYVINYL ALCOHOL AND OTHER WATER SOLUBLE RESINS

[75] Inventors: Warren H. Philipp, North Olmsted; Charles E. May, Rocky River; Li-Chen Hsu, Westlake; Dean W. Sheibley, Sandusky, all of Ohio

[73] Assignee: The United States of America as represented by the Administrator of the National Aeronautics and Space Administration, Washington, D.C.

[21] Appl. No.: 971,596

[22] Filed: Dec. 20, 1978

[51] Int. Cl.$^2$ .............................................. B05D 3/06
[52] U.S. Cl. ................................... 156/272; 156/292; 264/22; 264/212; 204/159.11; 204/159.14; 427/44; 428/500; 429/139
[58] Field of Search .......................... 427/44, 43, 37; 156/222, 292; 204/159.11, 159.14; 96/111, 115 R, 35.1, 27 R; 429/136, 139; 428/500; 264/22, 212

[56] References Cited

U.S. PATENT DOCUMENTS

| | | | |
|---|---|---|---|
| 3,558,358 | 1/1971 | Ropp | 429/139 |
| 3,720,321 | 3/1973 | Coughlin et al. | 204/159.14 |
| 3,957,605 | 5/1976 | Assarsson et al. | 204/159.14 |

*Primary Examiner*—John H. Newsome
*Attorney, Agent, or Firm*—Norman T. Musial; John R. Manning; James A. Mackin

[57] ABSTRACT

A self-supporting sheet structure comprising a water soluble, non-cross-linked polymer such as polyvinyl alcohol which is capable of being cross-linked by reaction with hydrogen atom radicals and hydroxyl molecule radicals is contacted with an aqueous solution having a pH of less than 8 and containing a dissolved salt in an amount sufficient to prevent substantial dissolution of the non-cross-linked polymer in the aqueous solution. The aqueous solution is then irradiated with ionizing radiation to form hydrogen atom radicals and hydroxyl molecule radicals and the irradiation is continued for a time sufficient to effect cross-linking of the water soluble polymer to produce a water-insoluble polymer sheet structure. The method has particular application in the production of battery separators and electrode envelopes for alkaline batteries. Low electrical resistivity, desirable in those applications, can be achieved by incorporating a highly conductive water soluble resin, such as polyacrylic acid, with the polyvinyl alcohol.

6 Claims, No Drawings

METHOD OF CROSS-LINKING POLYVINYL ALCOHOL AND OTHER WATER SOLUBLE RESINS

ORIGIN OF THE INVENTION

The invention described herein was made by employees of the United States Government and may be manufactured and used by or for the Government for governmental purposes without the payment of any royalties thereon or therefor.

FIELD OF THE INVENTION

The present invention relates to a cross-linked polymeric sheet structure and a method for producing such a structure and, more specifically, to a method for the cross-linking of a water soluble polymeric sheet structure, such as a polyvinyl alcohol sheet structure which is particularly useful in producing battery separator films.

BACKGROUND OF THE INVENTION

The use of polyvinyl alcohol as a separator material in alkaline batteries is well known. A standard electrolyte for alkaline batteries is concentrated aqueous potassium hydroxide. Although polyvinyl alcohol is soluble in water, it is not readily dissolved in such a concentrated potassium hydroxide solution, and thus, films of this material can be used in such electrolytes. In general, polyvinyl alcohol films have been utilized as battery separators because of their high conductivity in alkaline electrolytes and their ease of fabrication from aqueous solution.

Efforts have been made to improve the mechanical properties and chemical stability of polyvinyl alcohol by synthesizing numerous derivatives of the polymer. However, the number of processes for the in-situ reaction of prefabricated polyvinyl alcohol structures, such as battery separators, is limited. The in-situ acetalization of polyvinyl alcohol separators has been achieved through treatment of the separators with acid solutions of aldehydes, such as an aqueous formaldehyde solution containing a small amount of sulfuric acid. The aldehyde acetalates the 1,3 diol units present in the polymer thereby creating tough, water insoluble derivatives. In many of the aldehyde treatments, the extent of acetalization is difficult to control. Extensive acetalization of polyvinyl alcohol leads to poor conductivity in alkaline electrolyte, which is probably due to the decreased number of hydrophilic alcohol groups resulting from the using up of such groups by the acetalization reaction.

It is an object of the present invention to provide a method of making cross-linked polyvinyl alcohol and other water soluble polymeric sheet structures in which the extent of cross-linking is easily controlled. It is a further object to provide cross-linked polyvinyl alcohol structures having low electrical resistivity suitable for use as a separator or electrode envelope in an alkaline battery.

BRIEF SUMMARY OF THE INVENTION

The foregoing and other objects which will be apparent to those having ordinary skill in the art are achieved in accordance with the present invention by providing a method of cross-linking a pre-formed water soluble polymer comprising the steps of: providing a self-supporting sheet structure of a water soluble polymer capable of being cross-linked by reaction with hydrogen atom radicals and hydroxyl molecule radicals; contacting the polymer sheet structure with an aqueous solution having a pH of less than 8 and containing a dissolved salt in an amount sufficient to prevent substantial dissolution of the polymer sheet structure in the aqueous solution; irradiating the aqueous solution with ionizing radiation to form hydrogen atom radicals and hydroxyl molecule radicals; and maintaining the radiation for a time sufficient to effect cross-linking of the water soluble polymer to produce a water insoluble cross-linked polymer sheet structure.

Other features and advantages of the invention will be apparent from the description of preferred embodiments which follows.

DESCRIPTION OF PREFERRED EMBODIMENTS

The polymers useful in the invention are water soluble, film-forming, polymers which are capable of undergoing cross-linking by reaction with hydrogen atom radicals. Preferred film-forming polymers include polyvinyl alcohol, polyacrylic acid, polyacrylamide, and polyvinyl pyrollidone and mixtures thereof. A principal feature of the invention is in the fabrication of membranes and electrode envelopes for alkaline batteries and, for that application, polyvinyl alcohol, or polyvinyl alcohol blended with up to 50% by weight of polyacrylic acid, based on the polyvinyl alcohol, is preferred.

The polyvinyl alcohol resin may be a conventional, film-forming, polymeric material readily available commercially and can be of the type used heretofore for making separators for alkaline batteries. Commercially available polyvinyl alcohol normally contains about 0.5 to 6% of 1,2-diol units in the predominantly 1,3-diol structure. The presence of 1,2-diol units in the chain results in reduced resistance to oxidation. Accordingly, it is preferred, in the manufacture of sheet structures for alkaline batteries, to use a polyvinyl alcohol substantially free (i.e. containing less than about 5%) of 1,2-diol units. Polyvinyl alcohol having an essentially head-to-tail structuure of this type is readily available. It is made by the alcoholysis of polyvinyl acetate having an essentially head-to-tail structure which is made by low temperature polymerization of vinyl acetate. In the event that a polyvinyl alcohol having a substantial amount of 1,2-diol units is employed, or if it is desired to reduce or eliminate the amount of 1,2-diol units that may be present in the polyvinyl alcohol, then it is preferred to contact the present polymer film with an oxidizing agent (e.g. periodic acid) prior to effecting cross-linking, as disclosed in our co-pending application Ser. No. 897,829, filed Apr. 19, 1978, now U.S. Pat. No. 4,154,912, issued May 15, 1979, the disclosure of which is herein incorporated by reference. The polyvinyl alcohol is a film-forming resin having, generally, a molecular weight of 10,000–200,000 and is conveniently provided and used in aqueous solution such as 10–20% resin by weight.

The polymer or polymer blend is first formed into a self-supporting sheet structure, such as a film having a thickness suitable for a particular intended use. For example, an aqueous solution of the polymer may be cast into a sheet having a dry thickness of 50 to 400 microns suitable for use as a separator for an alkaline battery. The sheet material is then contacted with an aqueous solution having a pH of less than 8 and containing a dissolved salt, such as ammonium sulfate, present in an amount sufficient to substantially prevent dissolution of the non-cross-linked polymer in the acid solution. Conveniently, the sheet structure is immersed in the solution. Cross-linking is then effected by subjecting the aqueous solution to ionizing radiation to form hydrogen atom radicals. This effect of ionizing radiation is, of course, well known. When water is exposed to ionizing radiation, there are formed hydroxyl molecule radicals (OH.), hydrogen atom radicals (H.), hydrated electrons ($e^-_{aq}$) and hydrogen ions ($H^{30}$). This may be represented as:

$$H_2O \xrightarrow{radiation} OH. + H. + e^-_{aq} + H^+.$$

It is also known that in solution at a pH of less than 8, the hydrated electrons are converted to hydrogen atoms according to the equation:

$$e^-_{aq} + H^+ \rightarrow H.$$

In the present invention, cross-linking is probably effected because the H. and OH. radicals abstract hydrogen from the polymer resulting in the formation of polymer radicals which may be illustrated for polyacrylic acid as

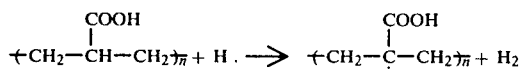

The polymer radicals then react with each other to form a cross-linked structure. The pH of the solution is conveniently less than 8.

In making battery separators, the sheet or other self-supporting structure containing the admixed resin and cross-linking agent can be cut or otherwise treated, prior to effecting cross-linking, to provide a physical configuration suitable for an intended use such as a battery separator. For example, a film dried to a thickness of 50-400 microns can be cut into sheets of appropriate size (e.g. 3"×4") and envelope bags can be fabricated by sealing the edges of superposed sheets. Sealing is readily accomplished by heat sealing or by suitable adhesive. A heat sealing temperature of about 200° C. is appropriate. A preferred adhesive is a solution of admixed resin and cross-linking agent similar to that from which the film was cast.

While a sheet thickness of 50-400 microns, preferably 100-200 microns, is customary for use as separators or electrode envelopes in conventional alkaline batteries, the sheet structures may be substantially thinner, e.g. 10 microns, and substantially thicker, e.g. ¼ inch, for more specialized applications.

A typical procedure is described as follows. First, a poly(vinyl alcohol) film, with or without poly(acrylic acid) is made by casting on a smooth surface the appropriate aqueous polymer solution. The dried film consisting of uncross-linked poly(vinyl alcohol) or an uncross-linked poly(vinyl alcohol)-poly(acrylic acid) mixture is now fabricated into the desired article such as an electrode bag. At this point, the films or membranes can be readily fabricated. The fabricated article is now immersed for several minutes in a dilute acid solution containing a salting out agent such as sodium sulfate which inhibits dissolution of the polymeric article. The soaked article is placed in a flat dish and covered with the acid solution containing the salting out agent to a depth of about 0.5 to 1 cm. The article, such as an electrode bag, submerged in this solution is then irradiated with ionizing radiation such as high energy electrons, which causes the formation of hydrogen atoms and hydroxyl radicals. These species then react with the polymeric material in the fabricated article resulting in cross-linking of the polymers. This cross-linking procedure converts the water soluble polymers to water insoluble materials. After being irradiated, the article is washed with water and air dried at room temperature.

An advantage of this technique is that water systems may be used. Thus, the use of hazardous organic solvents is avoided. Fabrication and making of these water soluble films is a simple operation, the final product after fabrication then becomes insoluble in water.

The method may also be used for cross-linking these polymers in an inert matrix such as asbestos. For example, an asbestos sheet is first impregnated or coated with polymer by immersion in an aqueous solution of the desired polymer or polymers and then dired. The matrix containing the desired polymer is then irradiated with ionizing radiation such as high energy electrons by the method described previously. The use of a support matrix is particularly useful where a strong self-supporting film is desired where the cross-linked film is weak. For example, a polyvinyl alcohol film containing a high proportion of polyacrylic acid swells considerably in an alkaline battery. A film of this sort can be made stronger and suitable for this use by incorporating a support matrix such as asbestos. Other support matrix materials can be used such as mineral wool, glass wool, water insoluble synthetic resins, and the like.

The following examples further illustrate the invention.

EXAMPLE 1

A poly(vinyl alcohol) film is made by casting a 10% aqueous solution of poly(vinyl alcohol) (viscosity of a 4% resin solids solution in water: 55 to 65 cps.) on a smooth glass surface with a Gardner knife. After the film air dries at room temperature, it is easily removed from the glass. The film is then cut into test specimens and immersed in the following solution (irradiation solution) for about one hour:

| Water | 1 liter |
|---|---|
| conc. $H_2SO_4$ | 20 ml |
| $Na_2SO_4$ | 200 grams |

The sodium sulfate, $Na_2SO_4$, functions to inhibit the dissolution of the polymer films during irradiation.

The wetted film is placed in a pyrex crystallizing dish and covered to a depth of about 0.5 cm with the above solution. The submerged poly(vinyl alcohol) films of various thicknesses are irradiated with 2 MeV electrons from a linear accelerator at $10^{-7}$ amp/cm² for various period of time as indicated in Table I. The film is then washed with water, then immersed in dilute sodium bicarbonate solution to neutralize absorbed acid, and finally, washed with water to remove salts. The film after air drying at room temperature has good mechanical strength and swells only slightly in KOH electrolyte. The resistivity as a function of radiation time is shown in Table I.

TABLE I

Resistivity in 45% aqueous KOH of radiation cross-linked poly(vinyl alcohol) membranes.

| Example | Run | Thickness ($\mu$) | Beam Density (amp/cm$^2$) | Radiation Time (min.) | Resistivity (ohm-cm$^2$) |
|---|---|---|---|---|---|
| 1 | A | 120 | 0 | 0 | 0.58 |
|   | B | 180 | 0 | 0 | 0.97 |
|   | C | 160 | $10^{-7}$ | 5 | 0.59 |
|   | D | 260 | $10^{-7}$ | 5 | 0.82 |
|   | E | 250 | $10^{-7}$ | 10 | 0.76 |
|   | F | 180 | $10^{-7}$ | 30 | 0.57 |
| 2 | A | 225 | 0 | 0 | 0.50 |
|   | B | 250 | $10^{-7}$ | 5 | 0.49 |
|   | C | 290 | $10^{-7}$ | 12 | 0.65 |
|   | D | 215 | $10^{-7}$ | 25 | 0.35 |
|   | E | 270 | $10^{-7}$ | 60 | 0.70 |

EXAMPLE 2

A poly(vinyl alcohol) having a lower molecular weight than the polyvinyl alcohol of Example 1 (4 to 6 cps–4% in water) film is made by casting a 20% poly(vinyl alcohol) aqueous solution by the technique of Example 1. Test specimens are soaked in the irradiation solution of Example 1 and then irradiated while submerged in this solution as described in Example 1. The irradiation parameters are 2 MeV electrons, $10^{-7}$ amp/cm$^2$. The resistivities of several films as a function of radiation time are shown in Table I.

EXAMPLE 3

A poly(vinyl alcohol)—poly(acrylic acid) 2:1 weight ratio polymer blend film is made by casting an aqueous solution containing 10% of the polyvinyl alcohol of Example 1 and 5% by by weight of poly(acrylic acid) added to lower film resistivity in alkaline electrolyte. The cross-linking technique is as described in Example 1. Radiation parameters are 2 MeV electrons, $10^{-7}$ amp/cm$^2$ and irradiation time was 0 to 30 minutes. The films of various thicknesses as shown in Table II have very low resistance in 45% KOH. However, these films swelled considerably in aqueous 45% KOH. The proportion of polyacrylic acid (50% based on the polyvinyl alcohol) is about the maximum amount that can be used practically for conducting membranes in alkaline electrolyte. These films also have relatively poor mechanical strength. Using a lower proportion of poly(acylic acid) results in a better mechanical film with little sacrifice in resistivity.

TABLE II

Resistivity in 45% aqueous KOH of radiation cross-linked films comprising poly(vinyl alcohol): poly(acrylic acid) in a 2:1 wt. ratio.

| Thickness $\mu$ | Beam Flux (amp/cm$^2$) | Radiation Time | Resistivity ohm-cm$^2$ |
|---|---|---|---|
| 100 | 0 | 0 | 0.16 |
| 110 | $10^{-7}$ | 5 | 0.10 |
| 110 | $10^{-7}$ | 15 | 0.14 |
| 130 | $10^{-7}$ | 30 | 0.13 |

EXAMPLE 4

An air dried 14 mil (350 microns) thick transparent film is made from an aqueous solution of polyvinyl alcohol and polyacrylic acid in a 2:1 weight ratio similar to the procedure described in Example 3. The film is then fabricated to envelope bags of 3⅛"×3¾" sized by heat sealing the edges or superposed sheets of film at a temperature of about 200° C.

The bags are irradiated with 2 MeV electrons at $10^{-7}$ amp/cm$^2$ for 30 minutes. The radiation cross-linked film shows an electrical resistivity of 0.382 ohms-cm$^2$ and a zincate ion diffusity of $2.80\times10^{-7}$ moles/cm$^2$—min. This membrane is evaluated as a battery separator in an 8 amp/hr Ni/Zn cell. The cell is cycled three times per day at 50% depth of discharge. The cycle consists of 6 hours charge and 2 hours discharge at C/12 and C/4 rates respectively. The cell displays at midpoint voltage of 1.57 volts at the C/2 rate on discharge. Current efficiency values for cycles of testing are 100% for 105 cycles and 80% for 210 cycles (total cycles). The cell does not short at 300 cycles.

What is claimed is:

1. A method of making a separator for an alkaline battery by cross-linking a pre-formed water soluble polymer comprising the steps of: providing an aqueous solution comprising a mixture of polyvinyl alcohol and up to 50% by weight, based on the weight of the polyvinyl alcohol, of polyacrylic acid; casting a film of the aqueous polymer solution; drying the film to form a self-supporting sheet structure capable of being cross-linked by reaction with hydrogen atom radicals and hydroxyl molecule radicals; contacting the polymer sheet structure with an aqueous solution having a pH of less than 8 and containing a dissolved salt in an amount sufficient to prevent substantial dissolution of the polymer sheet structure in the aqueous solution; irradiating the aqueous solution with ionizing radiation to form hydrogen atom radicals and hydroxyl molecule radicals; and maintaining said radiation for a time sufficient to effect cross-linking of the water soluble polymer to produce a water insoluble cross-linked polymer alkaline battery separator.

2. A method according to claim 1 wherein the self-supporting sheet structure is cut to a desired size prior to contacting the sheet structure with said aqueous solution.

3. A method according to claim 2 wherein two cut sheets are superposed and joined at their edges to form an envelope prior to contacting the sheet structure with said aqueous solution.

4. A method according to claim 1 wherein said ionizing radiation comprises high energy electrons.

5. A method according to claim 1 wherein said self-supporting sheet structure comprises a support matrix.

6. A method according to claim 5 wherein said support matrix is selected from the group consisting of asbestos, mineral wool, glass wool, and water insoluble synthetic resin.

* * * * *